US008396875B2

(12) United States Patent
Bennett et al.

(10) Patent No.: US 8,396,875 B2
(45) Date of Patent: Mar. 12, 2013

(54) ONLINE STRATIFIED SAMPLING FOR CLASSIFIER EVALUATION

(75) Inventors: Paul N Bennett, Kirkland, WA (US); Vitor R. Carvalho, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 12/817,457

(22) Filed: Jun. 17, 2010

(65) Prior Publication Data

US 2011/0314023 A1    Dec. 22, 2011

(51) Int. Cl.
G06F 7/00 (2006.01)
G06F 17/30 (2006.01)
G06F 15/18 (2006.01)
G06E 1/00 (2006.01)

(52) U.S. Cl. ............. 707/748; 707/749; 706/20; 706/21

(58) Field of Classification Search .................. None
See application file for complete search history.

(56) References Cited

U.S. PATENT DOCUMENTS

| 5,671,333 | A | 9/1997 | Catlett et al. | |
|---|---|---|---|---|
| 7,120,599 | B2 | 10/2006 | Keyes | |
| 7,698,071 | B2 * | 4/2010 | Harris | 702/19 |
| 2004/0111410 | A1 | 6/2004 | Burgoon et al. | |
| 2004/0148330 | A1 | 7/2004 | Alspector et al. | |
| 2004/0220838 | A1 | 11/2004 | Bonissone et al. | |
| 2005/0021290 | A1 | 1/2005 | Velipasaoglu et al. | |
| 2009/0048876 | A1 | 2/2009 | Bonissone et al. | |
| 2011/0054864 | A1 * | 3/2011 | Lundstedt et al. | 703/2 |

OTHER PUBLICATIONS

Dixon, et al., "Improving the Precision of Estimates of the Frequency of Rare Events". Ecology, vol. 85, No. 5, May 2005, retrieved on Sep. 30, 2010 at <<http://www.jstor.org/stable/3450872>>, 12 pages.
Fernandes, et al., "A stratified traffic sampling methodology for seeing the big picture," Computer Networks 52 (2008) 2677-2689, 13 pages.
Kish, "Survey Sampling", John Wiley & Sons, Inc., New York, copyright 1965, pp. 1-297.
Kish, "Survey Sampling", John Wiley & Sons, Inc., New York, copyright 1965, pp. 298-643.
Thompson, "Sampling", John Wiley & Sons, Inc., New York, copyright 2002, pp. 1-183.
Thompson, "Sampling", John Wiley & Sons, Inc., New York, copyright 2002, pp. 184-367.
Allan, Carterette, Aslam, Pavlu, Dachev, Kanoulas, "Million Query Track 2007 Overview", retrieved on Mar. 30, 2010 at <<http://maroo.cs.umass.edu/pub/web/getpdf.php?id=800>>, National Institute of Standards and Technology (NIST), Proceedings of Text REtrieval Conference (TREC), 2007, pp. 1-20.

(Continued)

*Primary Examiner* — Pierre Vital
*Assistant Examiner* — Berhanu Mitiku
(74) *Attorney, Agent, or Firm* — Lee & Hayes, PLLC

(57) ABSTRACT

To determine if a set of items belongs to a class of interest, the set of items is binned into sub-populations based on a score, ranking, or trait associated with each item. The sub-populations may be created based on the score associated with each item, such as an equal score interval, or with the distribution of the items within the overall population, such as a proportion interval. A determination is made of how may samples are needed from each sub-population in order to make an estimation regarding the entire set of items. Then a calculation of the precision and variance for each sub-population is completed and are combined to provide an overall precision and variance value for the overall population.

20 Claims, 8 Drawing Sheets

OTHER PUBLICATIONS

Bennett, "Using Asymmetric Distributions to Improve Text Classifier Probability Estimates", retrieved on Mar. 30, 2010 at <<http://doi.acm.org/10.1145/860435.860457>>, ACM, Conference on Research and Development in Information Retrieval, Jul. 28, 2003, pp. 111-118.

Carletta, "Assessing agreement on classification tasks: the kappa statistic", retrieved on Mar. 30, 2010 at <<http://homepages.inf.ed.ac.uk/jeanc/squib.pdf>>, Association for Computational Linguistics, Computational Linguistics, vol. 22, No. 2, 1996, pp. 1-6.

Carterette, Bennett, Chickering, Dumais, "Here or There Preference Judgments for Relevance", retrieved on Mar. 30, 2010 at http://research.microsoft.com/en-us/um/people/dmax/publications/ecir08.pdf>>, Springer-Verlag Berlin, Proceedings of the European Conference on Information Retrieval (ECIR), Mar. 2008, pp. 16-27.

Cormack, Lynam, "On-line Supervised Spam Filter Evaluation", retrieved on Mar. 30, 2010 at <<://citeseerx.ist.psu.edu/viewdoc/download?doi=10.1.1.86.2190&rep=rep1&type=pdf>>, ACM, Transactions on Information Systems (TOIS), vol. 25, No. 3, Jul. 2007, pp. 1-31.

Lewis, "Evaluating and Optimizing Autonomous Text Classification Systems", retrieved on Mar. 30, 2010 at <<http://net.pku.edu.cn/~wbia/2004/public_html/Readings/classification/(26)Evaluating%20and%20Optimizing%20Autonomous%20Text%20Classification%20Systems%20(1995).pdf>>, ACM, Conference on Research and Development in Information Retrieval, 1995, pp. 246-254.

Lewis, Yang, Rose, Li, "RCV1: A New Benchmark Collection for Text Categorization Research", retrieved on Mar. 30, 2010 at <<http://jmlr.csail.mit.edu/papers/volume5/lewis04a/lewis04a.pdf>>, JMLR.org, The Journal of Machine Learning Research, vol. 5, Dec. 2004, pp. 361-397.

Li, Guan, Wang, Xu, "Answer Extraction Based on System Similarity Model and Stratified Sampling Logistic Regression in Rare Date", retrieved on Mar. 30, 2010 at <<://paper.ijcsns.org/07_book/200603/200603A27.pdf>>, International Journal of Computer Science and Network Security (IJCSNS), vol. 6, No. 3, Mar. 2006, pp. 1-8.

Micheals, Boult, "Efficient Evaluation of Classification and Recognition Systems", retrieved on Mar. 30, 2010 at <<http://citeseerx.ist.psu.edu/viewdoc/download?doi=10.1.1.19.7725&rep=rep1&type=pdf>>, IEEE Computer Society, Conference on Computer Vision and Pattern Recognition (CVPR), vol. 1, Dec. 8, 2001, pp. 1-8.

Moran, He, Liu, "Choosing the Best Bayesian Classifier: An Empirical Study", retrieved on Mar. 30, 2010 at <<http://www.iaeng.org/IJCS/issues_v36/issue_4/IJCS_36_4_09.pdf>>, International Journal of Computer Science (IAENG), vol. 36, No. 4, Nov. 19, 2009, pp. 1-10.

"ODP—Open Directory Project", retrieved on Mar. 31, 2010 at <<http://www.dmoz.org.>>, Netscape, 1998-2010, pp. 1.

Platt, "Probabilistic Outputs for Support Vector Machines and Comparisons to Regularized Likelihood Methods", retrieved on Mar. 30, 2010 at <<http://citeseerx.ist.psu.edu/viewdoc/summary?doi=10.1.1.41.1639>>, MIT Press, Advances in Large Margin Classifiers, 1999, pp. 61-74.

Yilmaz, Kanoulas, Aslam, "A Simple and Efficient Sampling Method for Estimating AP and NDCG", retrieved on Mar. 30, 2010 at <<http://sewm.pku.edu.cn/src/paradise/reference/click-through%20evaluation/2008-SIGIR-A%20simple%20and%20efficient%20sampling%20method%20for%20estimating%20AP%20and%20NDCG.pdf>>, ACM, Conference on Research and Development in Information Retrieval, Jul. 20, 2008, pp. 603-610.

Zadrozny, "Learning and Evaluating Classifiers under Sample Selection Bias", retrieved on Mar. 30, 2010 at <<http://citeseerx.ist.psu.edu/viewdoc/download?doi=10.1.1.92.170&rep=rep1&type=pdf>>, ACM, Proceedings of Conference on Machine Learning (ICML), vol. 69, 2004, pp. 1-8.

Zadrozny, "Reducing multiclass to binary by coupling probability estimates", retrieved on Mar. 30, 2010 at <<http://books.nips.cc/papers/files/nips14/AA63.pdf>>, Advances in Neural Information Processing Systems, vol. 14 (NIPS 2001), Jun. 2002, pp. 1-8.

Zseby, "Stratification Strategies for Sampling-based Non-intrusive Measurements of One-way Delay", retrieved on Mar. 30, 2010 at <<http://www.nlanr.net/PAM2003/PAM2003papers/3748.pdf>>, Passive and Active Measurement Workshop (PAM 2003), Apr. 6, 2003, pp. 171-179.

\* cited by examiner

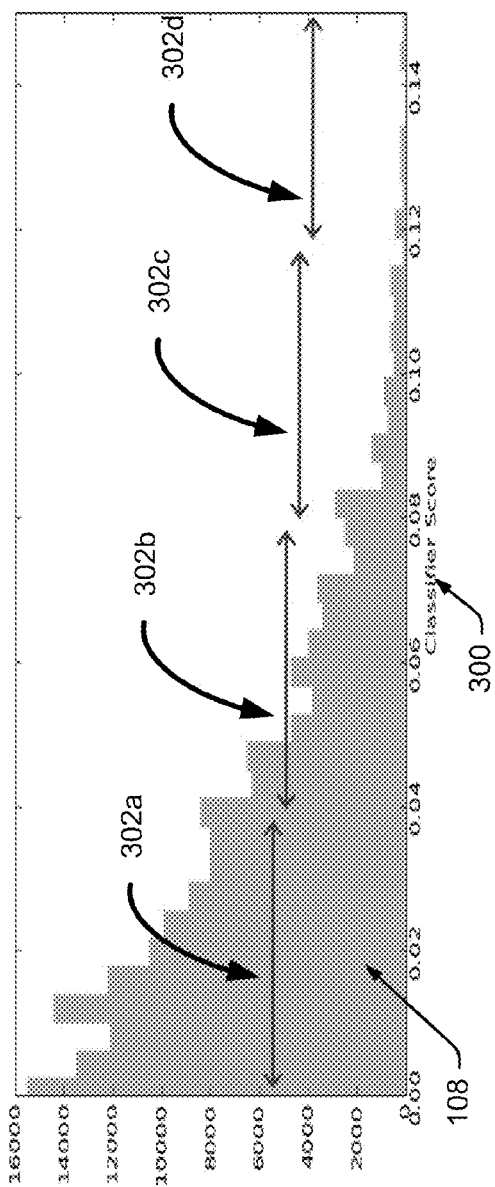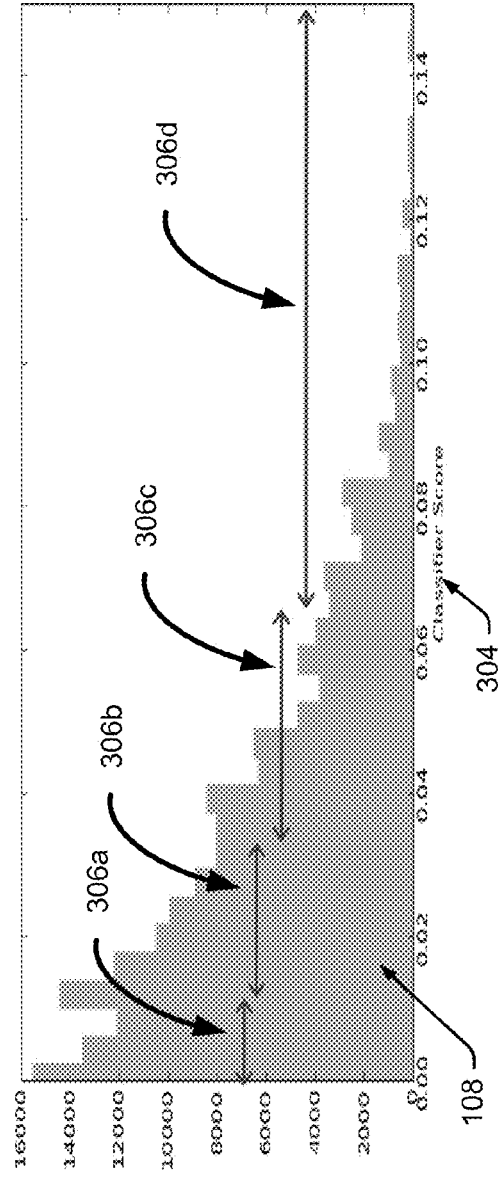

ONLINE STRATIFIED SAMPLING FOR CLASSIFIER EVALUATION

BACKGROUND

Classifiers have been used for a variety of information retrieval tasks including routing, web junk, spam identification, accelerated searching, and filtering. However, to deploy classification technology within a larger retrieval system may be resource intensive. Analyzing large quantities of information to make a determination regarding the content or disposition of the content may be balanced against the cost, quality, and/or time of the operation. Costs may be related to aggregating, querying, organizing, sampling, and making determinations of data associated with an overall population. The certainty or confidence in the determinations made about the information may be an indication of quality. Also, making the determinations in a timely manner may also be important.

Making determinations regarding a large quantity of information may be established through the use of statistics that may provide an estimate or determination of a characteristic of the information. For example, a web classifier may provide information related to the type of content that may be found on a web page. Millions of web pages may share similar content characteristics within varying degrees, such that certain web pages may be more strongly related to a topic of interest than other web pages. The cost of analyzing millions of web pages by their classifiers may be too high or time prohibitive. On the other hand, analyzing a smaller number of web pages may result in lower certainty or confidence in the determination or estimate. Accordingly, a person interested in making estimates about large quantities of data would prefer to be able to make high quality estimates with as few queries or samples as possible in a short amount of time. Certain types of large scale estimations also require direct human intervention in order to direct the sampling process and to verify whether or not each sample has a certain characteristic or property.

SUMMARY

This summary is provided to introduce the simplified concepts of an online (also called iterative) stratified sampling process for evaluating a classifier. The methods and systems are described in greater detail below in the Detailed Description. This summary is not intended to identify essential features of the claimed subject matter nor is it intended for use in determining the scope of the claimed subject matter.

Making estimations about a large amount of information can be addressed in many different ways. Dividing the large amount of information into smaller, more homogenous portions can improve the quality of estimations due to the reduction in variance within the smaller portions. Hence, the estimates within the sub-populations (these smaller portions) may be more accurate for that sub-population than for estimates made by random sampling of the overall population.

Items may be anything that belong to a class of interest or subject of interest to a user that is attempting to make an estimation regarding a status, indication, condition, capability, or probability related to the items. By way of example and not limitation, an item may be a web page, a voter record, an email, an entry in a database, a document, or any other content or information. In one specific example, a class of interest may be web pages that include content related to chocolate cookies. The class of interest may also be any topic associated with a web page which may include, a keyword or phrase associated with a web page, a word appearing in a web page, or a title associated with a web page. In another specific example, the class of interest may be voters who are likely to vote in an upcoming election. However, a large amount of items within a class of interest may vary widely in their relationship to the class of interest. For example, certain web pages may include more content about chocolate cookies than other web pages. Therefore, it would be helpful to have indication of this variability when making an estimation of all the web pages in the population. In one embodiment, a score is an indication of the likelihood that the item belongs to the class of interest; or, the score may be a direct estimate of a posterior probability that the item belongs to the class of interest. Alternatively, the score may indicate a similarity between the items according to other known characteristics.

The sub-populations derived from the overall population may be segregated in many different ways. In one embodiment, the sub-populations may be created by dividing the overall population according to their scores into equal ranges between the maximum score in the overall population (from the item estimated most likely to belong to the class of interest) and the minimum score in the overall population (from the item estimated least likely to belong to the class of interest). Alternatively, each sub-population may reflect an equal portion of the overall population. Such a portioning may be derived from the quantiles which would first sort the population by score.

Although each sub-population may include a smaller number of items than the overall population, the number of items for each sub-population may remain quite large. Accordingly, the number of samples from each sub-population may be chosen in an optimized or systematic way in order to achieve a quality estimate that requires the least amount of samples. Drawing or selecting items from each sub-population for sampling may be determined by the characteristics of the sub-population itself. In one embodiment, the number of items that may be drawn is based on a disproportional factor from a first sub-population. The disproportional factor may be determined by the number of items in the first sub-population and a standard deviation associated with the first sub-population. Further, the disproportional factor for each sub-population may be divided by a summation value. The summation value may be the sum of two or more disproportional factors associated with the overall population. Additionally, both methods may also be divided by a cost factor that reflects the cost of taking a sample from within each bin. Additional details regarding the techniques above will be discussed in more detail in the Detailed Description section.

Once the items have been drawn from the population, an estimation is calculated for each sub-population. The estimation is an indication of the relative likelihood that the items within the sub-population belong to a class of interest. The estimations for each sub-population are combined to provide an overall estimate for the overall population. The overall estimation is compared to one or more confidence or quality criteria to determine the remaining uncertainty in how strongly the overall population belongs to a class of interest. This process may be iterated until the one or more quality criteria are achieved and adequate certainty in the estimate is attained. For example, an online method samples a number of items from a plurality of sub-populations that form an overall population. The online method includes sampling a portion of the sub-populations and determining whether another sample is needed to confirm the strength to which the overall population belongs to a class of interest within a certain confidence bound. For example, precision and variance may be calculated for each sub-population; and, the separate precision and variance values for the sub-populations may be combined to determine overall precision and variance values for the overall population. Based on the overall precision and variance values the method may determine whether further samples are needed to satisfy one or more confidence criteria that the overall population is sufficiently related to a class of interest or subject matter area. The online method may iterate the process described above until one or more confidence criteria are satisfied one or more times in a row for the overall population (in one instantiation this is required two times in a row).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 3A is illustrative of a partitioned representative population according to an illustrative sampling method.

FIG. 3B is illustrative of a binned representative population according to another illustrative sampling method.

DETAILED DESCRIPTION

Overview

This disclosure relates to determining how strongly a set of items that belong to an overall population of items belong to a class of interest. As discussed above, when a set of items grows to a very large size; (such as the number of web pages available over the Internet) making a high confidence determination or estimation of whether the set of items belongs to a class of interest becomes more time consuming and more expensive. Accordingly, minimizing the number of samples needed to make a high confidence determination on how strongly a set of items belongs to a class of interest will reduce the cost of evaluating technology that clarifies and organizes related items within a large population set. When analyzing large quantities of information, it is desirable to use determination techniques that minimize cost, are of high quality, and are completed in less time. However, these factors may be balanced against each other depending on the importance given to each factor. Automating the estimation process would improve quality and reduce the cost and time for making estimations related to large quantities of information.

The described determination or estimation techniques minimize the number of samples needed to obtain an estimate of the precision and variance of a set of items within a certain confidence level. The set of items may be organized into sub-populations so that each sub-population indicates a trait, score, ranking, or feature associated with each item. The precision and variance for each sub-population may be calculated and then combined to provide an overall precision and variance for the entire population. If the overall precision and variance fail to meet one or more desired confidence criteria, more samples are drawn according to current allocation estimates of the population. The allocation estimates may be updated as the population changes or is updated in any manner. Moreover, in some implementations, samples are drawn as the online procedure iterates until the one or more desired confidence criteria is satisfied at least a predetermined number of times in a row (e.g., two times, three times, etc.).

Figure 1:
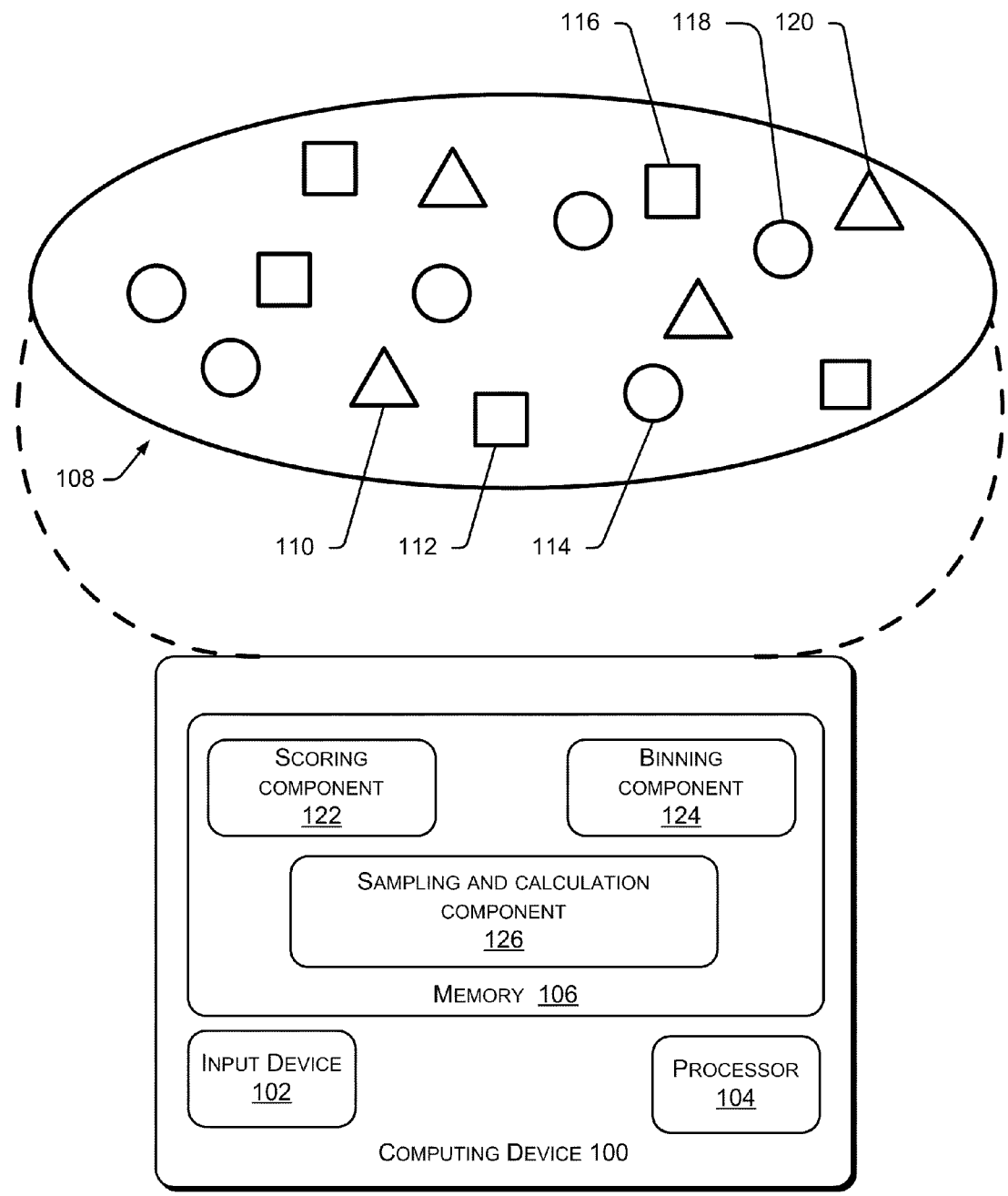
FIG. 1 is a schematic diagram of a representative population from which an illustrative computing device may retrieve information according to one embodiment.

FIG. 1 is an illustration of computing device 100 that provides determinations or estimates for large populations of items. The computing device 100 includes an input device 102, a processor 104, and a memory 106 that stores one or more programs for scoring, sampling, and/or binning items in a population. For example, the computing device 100 may include a scoring component 122, a binning component 124, and a sampling and calculation component 126. The aforementioned components will be discussed in greater detail below.

The computing device 100 may be configured as any suitable computing device capable of implementing a stratified sampling classifier system. By way of example and not limitation, suitable computing devices may include personal computers (PCs), servers, or any other device using memory and a processor. The processing unit 104 may be implemented as appropriate in hardware, software, firmware, or combinations thereof. Software or firmware implementations of the processing unit 104 may include computer- or machine-executable instructions written in any suitable programming language to perform the various functions described. Memory 106 may store program instructions that are loadable and executable on the processor 104, as well as data generated during the execution of these programs. Depending on the configuration and type of computing device, memory 106 may be volatile (such as RAM) and/or non-volatile (such as ROM, flash memory, etc.). The computing device or server may also include additional removable storage 806 and/or non-removable storage 808 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 106 may include multiple different types of memory, such as PRAM, and at least one other type of memory, such as SRAM, DRAM, or ROM.

A population 108 includes individual items that each may include various traits, scores, rankings, or features that are representative of the entire population 108. Individual items may also include various traits, scores, rankings, or features that may distinguish each item from other items within the population. The population 108 may be stored in the memory 106 of the computing device 100.

In one specific example, population 108 may represent potential voters. Voters may include various traits such as gender, age, race, and party affiliation. Each voter may also be associated with a ranking or score, such as whether they have voted in previous elections, expressed a likelihood they would vote in upcoming elections, or expressed an interest or disinterest in certain political issues. Hence, the overall voter population 108 may include several types of voters that may be organized or binned into relative categories. For example, the triangle voters 110 and 120 may indicate a Republican voter, square voters 112 and 116 may indicate a Democratic voter, and a circular voter (e.g. 114 or 118) may indicate an Independent voter.

In another embodiment, the population 108 may be representative of web pages found over the Internet. The web pages in population 108 may have a probability, score, or ranking associated with each item that indicates whether the web page includes content related to chocolate cookies or any other topic found on the Internet. For example, the triangle web pages (e.g. 110 and 120) may have probabilities associated with a first range of values; hence, they are shown as triangles. The square web pages (e.g. 112 and 116) may have probabilities that fall within a second range of values; hence, they are shown as squares. Lastly, the circular web pages (e.g. 114 and 118) may be associated with a third range of values. In one embodiment, the first range of values may represent web pages that have a higher probability of including chocolate cookie content than the second and third ranges of values. Although the shapes presented in FIG. 1 appear similar to each other, it does not require that each voter or web page represented by similar shapes are identical. For example, web page 110 may have a different probability of containing chocolate cookies content than web page 120 even though both web pages belong to the first range of values, as represented by their triangular shape. This similarly applies to the circular and square representations of the second and third ranges of values. The ranges of values associated are adjustable based on the discretion of the user analyzing the population and additional detail on binning and determining how many samples to select from the population will be described below.

Figure 2:
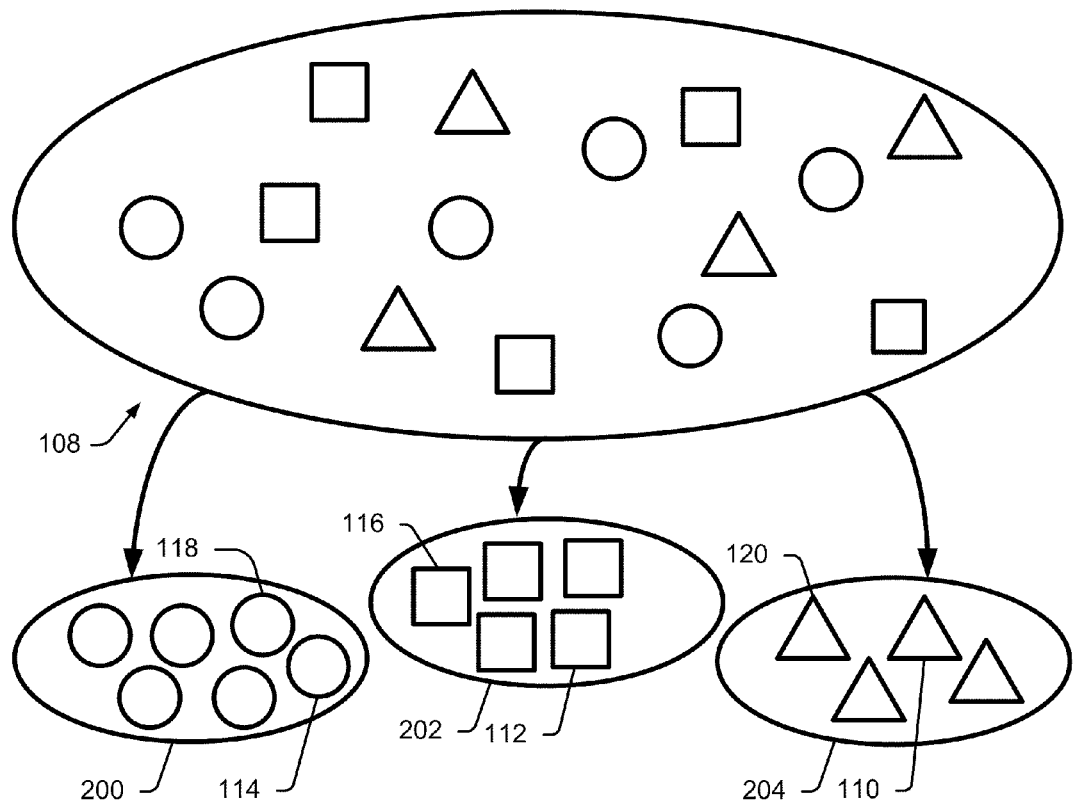
FIG. 2 is a schematic diagram representative of sub-populations into which the representative population may be divided according to an illustrative method.

FIG. 2 is an illustration of binning of the population 108 into three bins or strata 200, 202, and 204. Binning the overall population into groups that are more homogenous and calculating the variance for each bin reduces the variance that would be found by random sampling of the overall population. Hence, random sampling takes longer and is more costly to achieve a high quality estimate. As illustrated, the circular bin 200 includes the circular members of population 108 (e.g. 114 and 118), the square bin 202 includes the square members of population 108 (e.g. 112 and 1116), and the triangle bin 204 includes the triangle members of population 108 (e.g. 110 and 120). Each bin may represent a sub-population of the overall population 108. In another embodiment, FIGS. 3A and 3B represent population 108 in terms of classifier score and frequency, or in other words, a histogram. Charts 300 and 304 illustrate a classifier score on the x-axis and the frequency or number of items associated with a certain classifier on the y-axis. The higher the classifier score the higher the confidence level the item belongs to a class of interest. Hence, the lower the classifier score, the item is less likely to belong to a class of interest. For example, if the population 108 in chart 300 was related to web pages that have content related to chocolate cookies, the web pages found in the bin 302d have a higher confidence of being related to chocolate cookies, the class of interest, than the web pages found in bin 302a.

FIG. 3A is one embodiment for binning population 108. Chart 300 represents population 108 as divided into bins or sub-populations that have equal ranges, hence it's called equal score binning. Specifically, the division of population 108 is based on equal intervals between the maximum and the minimum scores found within the population 108. For example, if the minimum score was 0 and the maximum score was 10, the first bin breakout may be 0-2.5, the second bin may be 2.51-5.0, the third bin 5.01-7.5, and the fourth bin 7.51-10.0. In FIG. 3A if the minimum score is 0 and the maximum score is 0.16, the first bin 302a includes items with scores between 0 and 0.04, the second bin 302b includes items with scores between 0.04 and 0.08, the third bin 302c includes items with scores between 0.08 and 0.12, and the fourth bin 302d includes items with scores between 0.12 and 0.16. The number of bins may also vary, such that there could be two, three, or five or more bins instead of the four bins that are illustrated in FIG. 3A. Alternatively, the items of population 108 may be binned according to a set of known attributes associated with the items. For example, instead of a score, each item may have attribute in common with other items and binning population may be binned based on the common attributes of the items. The common attribute may include features such as keywords, top-level domain address, file size, date created, change history, or any other attribute that may be associated with web page, document, or data table. Common attribute binning may not have to be a direct estimate of the likelihood that each item belongs to a class of interest. As illustrated in FIG. 2, the common attributes may be represented by the common shapes in population 108, with each shape representative of a common attribute as shown in bins 200, 202, and 204.

FIG. 3B is another embodiment for binning population 108. In the instance of chart 304 the bins may include equal portions of population 108. In other words, the same number of items may be found in each bin or each bin includes the same percentage of items found in the other bins. For example, if population 108 in FIG. 3B included 200 items, bins 306a, b, c, and d may each include 50 items. Hence, the bins in FIG. 3B may be independent of the classifier score. But, in an alternative embodiment, the binning of population 108 may include a combination of the embodiments presented in FIGS. 3A and 3B.

Figure 4:
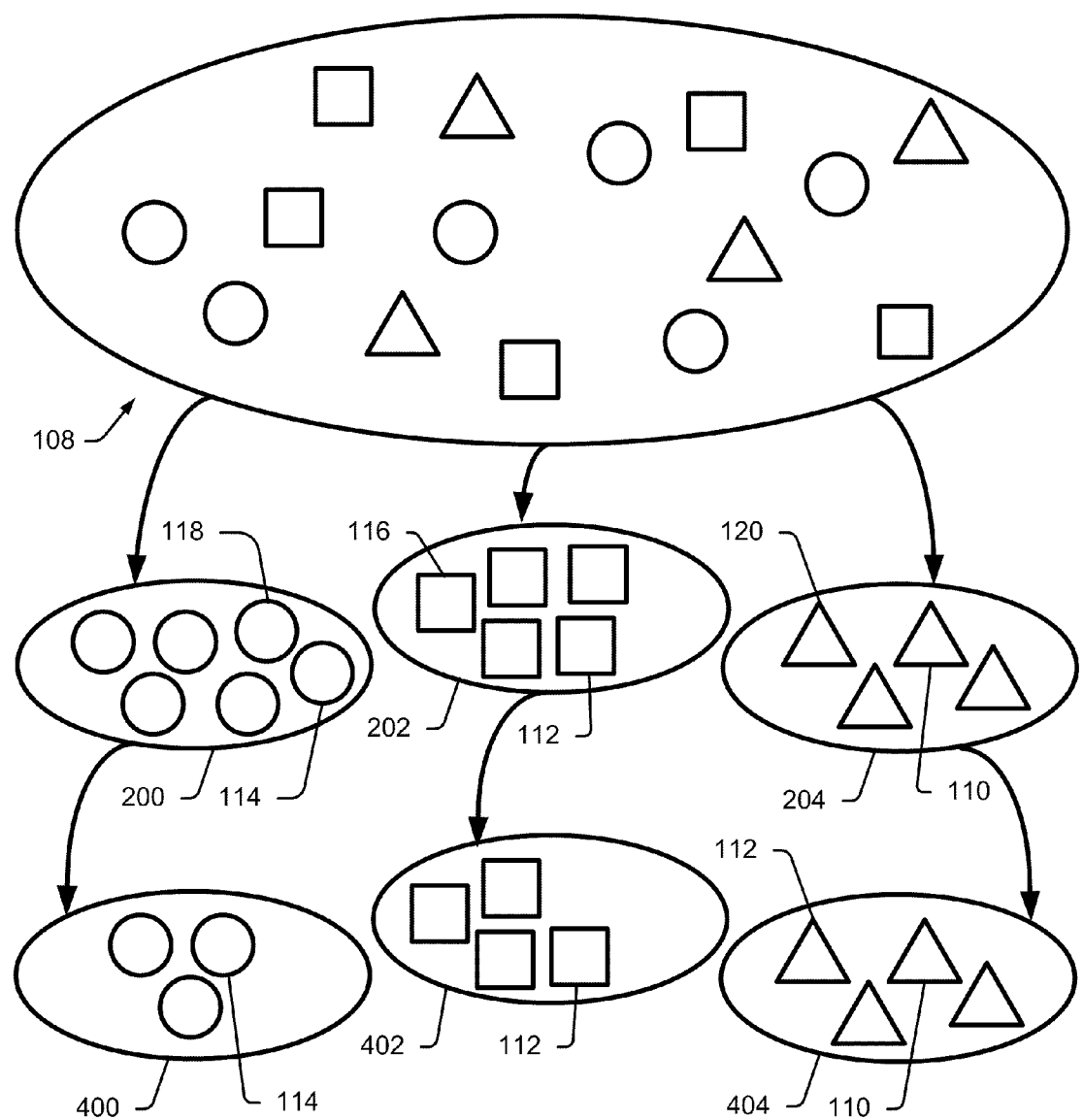
FIG. 4 is a schematic diagram of representative sampled sub-populations according to one of the illustrative sampling methods described herein.

FIG. 4 includes an example of a stratified sampling plan of bins 200, 202, and 204. As will be discussed in greater detail below, a number of items from each of the sub-population bins (e.g. 200, 202, and 204) are selected for sampling. For purposes of explanation and illustration, FIG. 4 shows that three elements are selected from the circular bin 200 for sampling, which includes item 114 and two other items as shown in bin 400. Four items from the square bin 202 are selected for sampling, which include item 112 and three other items as shown in bin 402. Also, all of the triangles in the triangle bin 204 (including 110 and 112) are selected for sampling as shown in bin 404. Stratified sampling provides more homogenous sub-populations that create more accurate statistical results by reducing the variance between the items. This may result in more accurate estimations with a fewer number of samples required in order to determine if the overall population is sufficiently related to a class of interest. In alternative embodiments, bins 200, 202, and 204 may include several million items each, such as web pages that may have content related to the subject of chocolate cookies or any other topic. Hence, sampling every chocolate cookie web page in bins 200, 202, and 204 would be time and cost prohibitive. Instead, stratified sampling may minimize the amount of samples taken to determine how strongly the items in population 108 belong to a class of interest. The stratified samples of population 108 are reflected in bins 400, 402, and 404.

Figure 5:
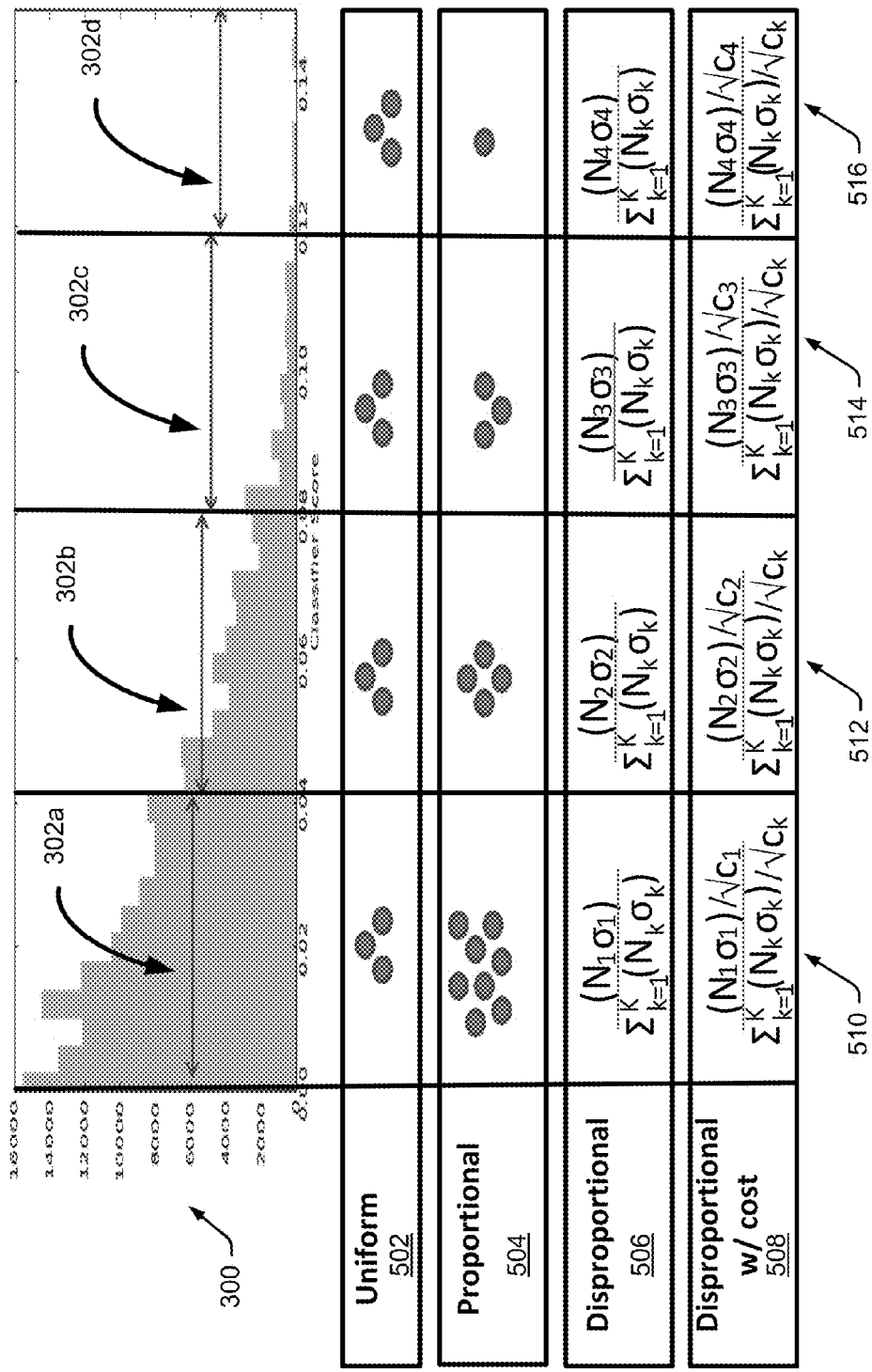
FIG. 5 is illustrative of a binned representative population according to various illustrative sampling strategies.

FIG. 5 provides an illustrative overview of the possible sampling strategies that may be employed using the online procedure described above. Sampling table 500 includes explanations of various sampling strategies and is shown in conjunction with chart 300 for purposes of explanation. Bins 302a, b, c, and d correspond to columns 510, 512, 514, and 516 respectively in the sampling table 500.

A uniform sampling strategy samples the same number of items from each sampling bin. For example, row 502 of sampling table 500 shows that three items are sampled from each of the 302 bins.

A proportional sampling strategy directs that a number of items within a bin are sampled based on the proportion of items falling within the bin, and such that the number of sampled items within the bin are proportional to the number of items present in the bin related to the number of items in the total population. For example, row 504 of sampling table 500 shows that the number of sampled items for each 302 bin is proportional to the total number of items that are in each bin. Therefore, since bin 302a has more items than any other 302 bin, it will have a greater number of items being sampled. Also, if the number of items within bin 302a fluctuate, the number of sampled items will adjust accordingly. For example, if additional items are added to a particular bin over time, proportional sampling may adjust the total number of items being sampled from that bin.

A disproportional sampling strategy will allocate samples based at least on the number of samples within a bin (numbered i) and the standard deviation of those samples, such that the allocation of samples for each bin is determined by multiplying the number of samples in the bin ($N_i$) by the standard deviation of the samples within the bin ($\sigma_i$). As represented by the following equation:

$$\text{Sample Allocation Probability} \propto N_i \sigma_i \quad (1)$$

Further, the sample allocation distribution may be determined by dividing equation (1) by a summation value, the summation value being the sum of all the sample allocations for each bin. As represented by the following equation:

$$\text{Sample Allocation Probability} = \frac{N_i \sigma_i}{\sum_{k=1}^{K} N_k \sigma_k} \quad (2)$$

With K representing the total number of bins used to divide the overall population 108. By way of example, row 506 of sampling table 500 illustrates the disproportional strategy.

A disproportional and cost sampling strategy implements a cost element to the disproportional sampling strategy. Therefore, sample allocations may account for the cost of taking one sample from each bin. Incorporating a cost element into the sampling strategy will reduce the number of allocated samples as the cost of taking the samples increases. As represented by the following equations:

$$\text{Sample Allocation Probability} \propto (N_i \sigma_i) / \sqrt{c_i} \quad (3)$$

$$\text{Sample Allocation Probability} = \frac{N_i \sigma_i}{\sqrt{c_i} \sum_{k=1}^{K} \frac{N_k \sigma_k}{\sqrt{c_k}}} \quad (4)$$

An example of the disproportional and cost sampling strategy is illustrated in row 508 of the sampling table 500. In one embodiment, cost may be inversely proportional to a percentage of positive items within each sub-population. Alternatively, cost may also be the cost to obtain one positive result, which is on average $$\frac{1}{P_k},$$

where $P_k$ is the probability or an estimate of the probability of a positive result being found in the sub-population.

The disproportional and cost sampling strategy may also be used for a cost sensitive exploration-exploitation in performing recall estimation for a set of items. Although the cost estimate used in the precision estimation above is related to the cost estimate used for recall estimation, the cost to achieve a tightly bound recall estimation is very costly when compared to a tightly bound precision estimation. A recall estimate is based on the following equation:

$$\text{Recall} = \frac{\text{Number of True Positives Predicted}}{\text{Number of True Postives} + \text{Number of False Postives}} \quad (5)$$

Figure 6:
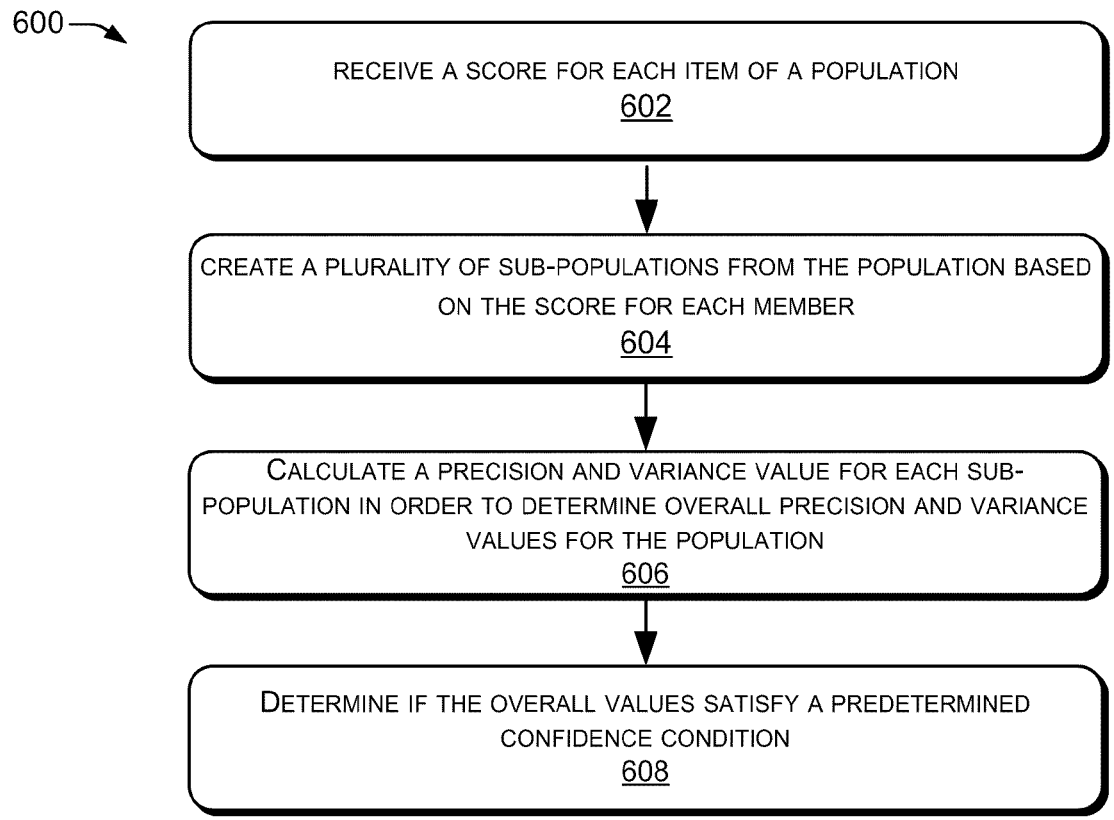
FIG. 6 is a flowchart of an example binning method.

FIG. 6 is a flowchart 600 illustrating the binning process that may be implemented using a variety of binning strategies. At block 602, the scoring component 122 receives or generates a score for each item of a population that indicates a characteristic for each item. The score may include a ranking number, feature, or a trait associated with a population that may distinguish items within the population. For example, the score may be a classifier score for a web page that indicates the likelihood that the web page belongs to a class of web pages or that the score is a direct estimate of the posterior probability that the web page belongs to a class of web pages. Alternatively, the score may represent a gender or party affiliation based on a population of voters.

At block 604, the binning component 124 creates a plurality of sub-populations from the overall population 108 based on the score for each item or the distribution of the items in the overall population. As noted above in the discussion for FIGS. 3A and 3B, the number of bins to divide the sub-population is selectable based on the intent of the user of the system 100. But, in one embodiment, the number of items assigned to each bin may be based on an equal intervals, such that the division of population 108 is based on equal intervals between the maximum and the minimum scores found within the population 108, see FIG. 3A. In another embodiment, the number of items within each bin are equal, see FIG. 3B.

At block 606, the sampling and calculation component 126 calculates the precision and variance for each sub-population and combines the values for each sub-population to generate an overall precision value and overall variance value for the overall population 108. Generating the overall values may be accomplished as shown in equations 6 and 8 described below.

At block 608, the sampling and calculation component 126 determines if the overall precision and variance values satisfy a predetermined confidence condition. Additional details of this determination are provided in the discussion of FIG. 7.

Figure 7A:
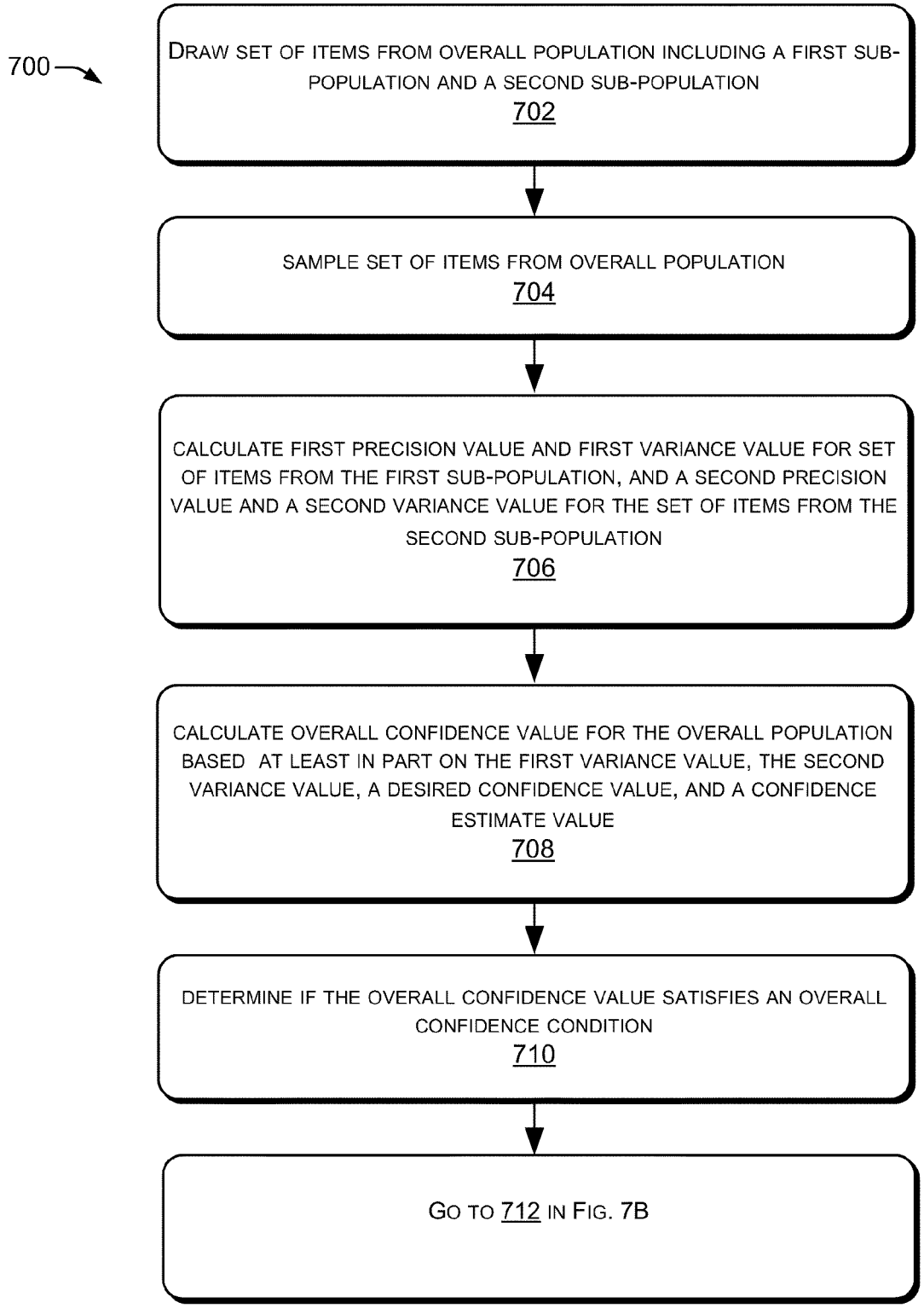
FIG. 7A is a flow chart of an example iterative sampling method.
Figure 7B:
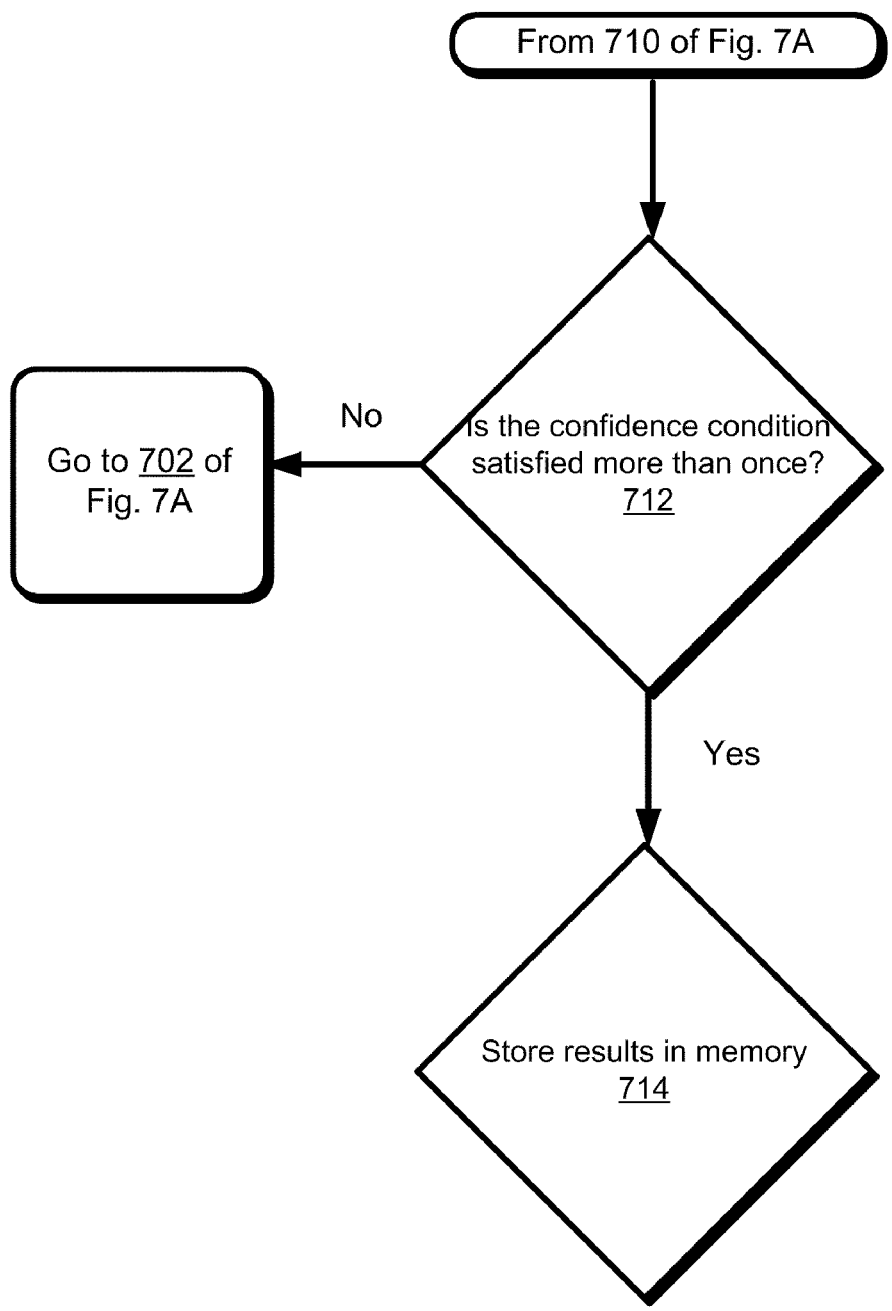
FIG. 7B is a continuation of the flow chart of the example iterative sampling method described in FIG. 7A.

FIG. 7 is a flowchart 700 of an algorithm for confidently determining if items within a population are related to a class of interest. At block 702, the sampling and calculation component 126 draws a set of items from an overall population that have been binned by the binning component 124. The set of items drawn from the population includes items from two sub-populations as designated by the bins. The method may include more than two subpopulations; but, two are presented here solely for ease of illustration. The number to draw from each sub-population may be determined from the sampling strategies discussed above in the remarks for FIG. 5.

At block 704, the sampling and calculation component 126 samples the data, characteristics, or score of the items that may be used to calculate the precision and variance of the items found within each bin or sub-population. In another embodiment, the sampling and calculation component may calculate variables used for the recall estimate described in equation (5) above.

At block 706, the sampling and calculation component 126 calculates a first precision value and a first variance value for the set of sampled items from the first sub-population and a second precision value and a second variance value for the set of sampled items from the second sub-population. Where N represents the number of items within an overall population and k represents each sub-population that each have $N_k$ elements such that $$\sum_{k=1}^{K} N_k = N$$

N and that the number of sampled elements from each sub-population are represented by $n_k$. The methods for determining $n_k$ were discussed above in regards to FIG. 5.

Precision may be calculated using the following equation:

$$\hat{p} = \sum_{k=1}^{K} \frac{N_K}{N} \hat{p}_K \quad (6)$$

wherein, $\hat{p}_K = \frac{1}{n_k}\sum_{j=1}^{n_k} y_j$, $y_j$ being a binary class variable (7)

Variance may be calculated using the following equation:

$$\text{var}(\hat{p}) = \sum_{k=1}^{K} \left(\frac{N_K}{N}\right)^2 \text{var}(\widehat{p_k}) \quad (8)$$

wherein $\text{var}(\widehat{p_k}) = \left(1 - \frac{n_k}{N_k}\right)\frac{\widehat{p_k}(1-\hat{p}_k)}{(n_k-1)} \quad (9)$ In some embodiments where $n_k$ is very small, $$\left(1 - \frac{n_k}{N_k}\right)$$

may be omitted from equation 9 above.

At block 708, the sampling and calculation component 126 calculates an overall confidence value based at least in part on the first variance value, the second variance value, a desired confidence value, and a confidence estimate value. The desired confidence value is determined by the user of system 100 and may be expressed as a percentage, such as 95% or as 0.05.

At block 710, the overall confidence value is compared against an overall confidence condition stored in memory 116 of system 100. The overall confidence value may be the standard error for the overall population being less than or equal to a predetermined ratio. The predetermined ratio may include an predetermined difference from a target value over a predetermined confidence value. For example, the predetermined difference value may be a +/− range (i.e. +/−0.02) from a target set by system 100 or selected by the user of system 100. The user of system 100 also sets the predetermined confidence value at a desired level. In one embodiment, overall confidence condition may include a +/−0.02 delta from target with a 95% confidence level. The 95% confidence level could be represented by the approximate value of 1.96, which represents a 95% confidence level for a normal distribution. Hence, to pass the overall confidence condition, the overall confidence value should be less than or equal to $$\frac{0.02}{1.96}.$$

At block 712, if the confidence condition is not satisfied more than once, the process proceeds back to step 702 and repeats until the confidence condition is satisfied at least two times. More generally, the system can require that the confidence condition is satisfied n sequential times. For example, system 100 iterates the steps above with another set of items drawn from the overall population until the overall confidence value is satisfied at least two times in a row. If the overall confidence value is achieved at least two times then the results are stored in memory 106 as illustrated in block 714.

CONCLUSION

Although the embodiments have been described in language specific to structural features and/or methodological acts, it is to be understood that the invention is not necessarily limited to the specific features or acts described. Rather, the specific features and acts are disclosed as illustrative forms of implementing the invention.

What is claimed is:

1. One or more computer-readable storage devices storing computer-executable instructions that, when executed by a processor of a computing device, configure the processor to perform acts comprising:
    drawing a set of items from an overall population, the set of items including a first sub-population and a second sub-population;
    sampling the set of items from the overall population;
    calculating a first precision value and a first variance value for the set of items from the first sub-population, and a second precision value and a second variance value for the set of items from the second sub-population;
    calculating an overall confidence value for the overall population based at least in part on the first variance value, the second variance value, a desired confidence value, and a confidence estimate value; and
    determining if the overall confidence value satisfies an overall confidence condition, the overall confidence condition comprising a standard error for the overall population being less than or equal to a predetermined ratio, wherein the predetermined ratio includes a predetermined difference from a target value over a predetermined confidence value.

2. The one or more computer-readable storage devices of claim 1, further comprising iterating the steps above with another set of items from the overall population until the overall confidence condition is satisfied at least two times in a row.

3. The one or more computer-readable storage devices of claim 1, wherein the first sub-population and the second sub-population are each defined by a score range and each item within the overall population has a score that determines to which sub-population each item is assigned.

4. The one or more computer-readable storage devices of claim 1, wherein the drawing of the set of items is based in part on a number of items in the first sub-population, a standard deviation of the number of items in the first sub-population, a number of items within the second sub-population, and a standard deviation of the number of items in the second sub-population.

5. The one or more computer-readable storage devices of claim 4, wherein:
the drawing of the set of items from the first sub-population is further based in part on a summation value associated with the first sub-population and the second sub-population; and
the drawing of the set of items from the second sub-population is further based in part on the summation value associated with the first sub-population and the second sub-population,
the summation value is based at least in part on:
the number of items in the first sub-population,
the standard deviation of the number of items in the first sub-population,
the number of items in the second sub-population, and
the standard deviation of the number of items in the second sub-population.

6. The one or more computer-readable storage devices of claim 5, wherein the drawing of the set of items from the first sub-population is further based in part on the square root of a cost of sampling an item from the first sub-population and the drawing of the set of items from the second sub-population is further based in part on the square root of a cost of sampling an item from the second sub-population.

7. The one or more computer-readable storage devices of claim 6, wherein the cost of sampling is inversely proportional to a percentage of positive items within each sub-population.

8. The one or more computer-readable storage devices of claim 1, further comprising providing an initial estimate for each sub-population to weight the precision and the variance calculations to prevent skewing of the precision and variance calculations.

9. The one or more computer-readable storage devices of claim 1, wherein the first sub-population and second sub-population being more homogenous than the overall population.

10. A system comprising:
a processor;
memory that stores items from an overall population;
a scoring component stored in the memory and executable on the processor to assign a score to each item in the overall population;
a binning component stored in the memory and executable on the processor to divide the overall population of items into two or more sub-populations based on the score of each item; and
a sampling and calculation component stored in the memory and executable on the processor to:
draw a set of items from each sub-population;
calculate a precision value and a variance value for each sub-population based on the set of items from each sub-population;
calculate an overall confidence value for the overall population based on each of the variance values, a desired confidence value, and a confidence estimate value;
determine if the overall confidence value satisfies an overall confidence condition; and
iterate the draw a set of items, calculate a precision value, calculate an overall confidence value, and determine features with another set of items from the overall population until the overall confidence condition is satisfied at least two times in a row.

11. The system of claim 10, wherein the drawing of the set of items is based in part on a number of items in the first sub-population, a standard deviation of the number of items in the first sub-population, a number of items within the second sub-population, and a standard deviation of the number of items in the second sub-population.

12. The system of claim 10, wherein the overall confidence condition comprises a standard error for the overall population being less than or equal to a predetermined ratio.

13. The system of claim 10, wherein each sub-population of the two or more sub-populations is more homogenous than the overall population.

14. A method comprising:
under control of one or more processors configured with executable instructions: drawing a set of items from an overall population, the set of items including a first sub-population and a second sub-population;
sampling the set of items from the overall population;
calculating a first precision value and a first variance value for the set of items from the first sub-population, and a second precision value and a second variance value for the set of items from the second sub-population;
calculating an overall confidence value for the overall population based at least in part on the first variance value, the second variance value, a desired confidence value, and a confidence estimate value; and
determining, by a computing device, if the overall confidence value satisfies an overall confidence condition, the overall confidence condition comprising a standard error for the overall population being less than or equal to a predetermined ratio, the predetermined ratio includes a predetermined difference from a target value over a predetermined confidence value.

15. The method of claim 14, further comprising iterating the steps above with another set of items from the overall population until the overall confidence condition is satisfied at least two times in a row.

16. The method of claim 14, wherein the first sub-population and the second sub-population are each defined by a score range and each item within the overall population has a score that determines to which sub-population each item is assigned.

17. The method of claim 14, wherein the drawing of the set of items is based in part on a number of items in the first sub-population, a standard deviation of the number of items in the first sub-population, a number of items within the second sub-population, and a standard deviation of the number of items in the second sub-population.

18. The method of claim 17, wherein:
the drawing of the set of items from the first sub-population is further based in part on a summation value associated with the first sub-population and the second sub-population; and
the drawing of the set of items from the second sub-population is further based in part on the summation value associated with the first sub-population and the second sub-population, the summation value is based at least in part on:
the number of items in the first sub-population,
the standard deviation of the number of items in the first sub-population,
the number of items in the second sub-population, and
the standard deviation of the number of items in the second sub-population.

19. The method of claim 18, wherein the drawing of the set of items from the first sub-population is further based in part on the square root of a cost of sampling an item from the first sub-population and the drawing of the set of items from the second sub-population is further based in part on the square root of a cost of sampling an item from the second sub-population.

20. The method of claim 19, wherein the first sub-population and second sub-population being more homogenous than the overall population.

\* \* \* \* \*